United States Patent
Pan

(10) Patent No.: US 6,796,218 B1
(45) Date of Patent: Sep. 28, 2004

(54) GRILL DEVICE PROVIDED WITH AN ADJUSTABLE SEASONING SUPPLYING UNIT

(75) Inventor: Chung-Ho Pan, Kaohsiung Hsien (TW)

(73) Assignee: Tsann Kuen Enterprise Co., Ltd., Taipei (TW)

( * ) Notice: Subject to any disclaimer, the term of this patent is extended or adjusted under 35 U.S.C. 154(b) by 0 days.

(21) Appl. No.: 10/682,889

(22) Filed: Oct. 14, 2003

(51) Int. Cl.[7] .................. A47J 37/00; A47J 37/06; A47J 37/08; A23L 1/00
(52) U.S. Cl. .................. 99/339; 99/345; 99/347; 99/349; 99/372; 99/374; 99/375; 99/378; 99/400; 99/425; 99/445; 99/446; 99/494
(58) Field of Search .................. 99/31–333, 339, 99/340, 345–347, 349–351, 353–355, 372–382, 400, 401, 444–450, 422, 425, 482, 494; 126/369, 25 R, 20, 41 R; 219/521–525, 386, 401; 426/523, 510, 511

(56) References Cited

U.S. PATENT DOCUMENTS

| 4,066,010 A | * | 1/1978 | Larsson | 99/346 |
|---|---|---|---|---|
| 5,129,313 A | * | 7/1992 | Coppier | 99/376 |
| 5,606,905 A | * | 3/1997 | Boehm et al. | 99/375 |
| 5,615,604 A | * | 4/1997 | Chenglin | 99/332 |
| 5,845,562 A | * | 12/1998 | Deni et al. | 99/375 |
| 5,848,567 A | * | 12/1998 | Chiang | 99/375 |
| 5,913,965 A | * | 6/1999 | Gargano | 99/346 |
| 6,012,380 A | * | 1/2000 | Hermansson | 99/337 |
| 6,170,389 B1 | * | 1/2001 | Brady | 99/332 |
| 6,257,126 B1 | * | 7/2001 | Veljkovic et al. | 99/349 |
| 6,269,738 B1 | * | 8/2001 | Huang | 99/375 |
| 6,276,263 B1 | * | 8/2001 | Huang | 99/375 |
| 6,389,959 B1 | * | 5/2002 | Robertson | 99/331 |
| 6,484,624 B1 | | 11/2002 | Wu | |

* cited by examiner

Primary Examiner—Tmothy F. Simone
(74) Attorney, Agent, or Firm—Harness, Dickey & Pierce, P.L.C.

(57) ABSTRACT

A grill device includes a base unit, a seasoning retaining vessel, and a seasoning supply unit. The base unit includes a housing, a cooking member mounted in the housing, and at least one supply tube connected to the cooking member and extending downwardly relative to the cooking member. The vessel has a tube immersing portion disposed under the cooking member for extension of the supply tube thereinto, and a container mounting portion in fluid communication with the tube immersing portion. The seasoning supplying unit includes a flow control member connected to a container member and mounted adjustably in the container mounting portion. The flow control member controls the flow of seasoning in the container member into the vessel in accordance with the level of the seasoning in the vessel.

15 Claims, 8 Drawing Sheets

GRILL DEVICE PROVIDED WITH AN ADJUSTABLE SEASONING SUPPLYING UNIT

BACKGROUND OF THE INVENTION

1. Field of the Invention

The invention relates to a grill device, more particularly to a grill device provided with an adjustable seasoning supplying unit.

2. Description of the Related Art

In U.S. Pat. No. 6,484,624, there is disclosed a grill device that includes an upper grill unit pivoted to a lower grill unit so as to rotate about an axis between an open position and a closed position, in which the upper and lower grill units cooperatively define a cooking space therebetween. A seasoning supplying unit includes a vessel mounted in the cooking space to receive a body of seasonings in liquid form, and a thermal conductive dispenser. The thermal conductive dispenser is extendible into the vessel when the upper grill unit is positioned at the closed position, and defines a plurality of channels. Each of the channels has an inlet that is immersed in seasonings in the vessel, and an outlet that is exposed from the vessel when the upper grill unit is positioned at the closed position.

Although the aforesaid grill device permits the supply of seasonings when cooking foodstuff without the need to pivot the upper grill unit to the open position, the rate of dispensing of the seasonings cannot be adjusted to meet actual cooking requirements.

SUMMARY OF THE INVENTION

Therefore, the object of the present invention is to provide a grill device that can overcome the aforesaid drawback associated with the prior art.

Accordingly, the present invention provides a grill device that comprises a base unit, a seasoning retaining vessel, and a seasoning supply unit.

The base unit includes a housing, a cooking member mounted in the housing, a heating element operatively coupled to the cooking member for supplying heat to the cooking member, and at least one supply tube connected to the cooking member and extending downwardly relative to the cooking member. The cooking member is made of a heat conductive material, and has a top side that defines a cooking space, and a bottom side opposite to the top side. The supply tube defines a channel that is in fluid communication with the cooking space.

The seasoning retaining vessel has a tube immersing portion and a container mounting portion in fluid communication with the tube immersing portion. The tube immersing portion is disposed under the cooking member such that the supply tube extends into the tube immersing portion.

The seasoning supplying unit includes a container member adapted for storing a body of seasoning in liquid form, and a flow control member connected to the container member and mounted adjustably on the vessel in the container mounting portion.

In the preferred embodiment, the base unit includes at least two of the supply tubes that extend downwardly at different lengths into the tube immersing portion of the seasoning retaining vessel. The flow control member controls flow of the seasoning in the container member into the vessel in accordance with level of the seasoning in the vessel such that the number of the supply tubes immersed in the seasoning in the tube immersing portion of the vessel depends on the level of the seasoning in the vessel and determines a rate of vaporizing and dispensing of the seasoning to the cooking space through the supply tubes.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
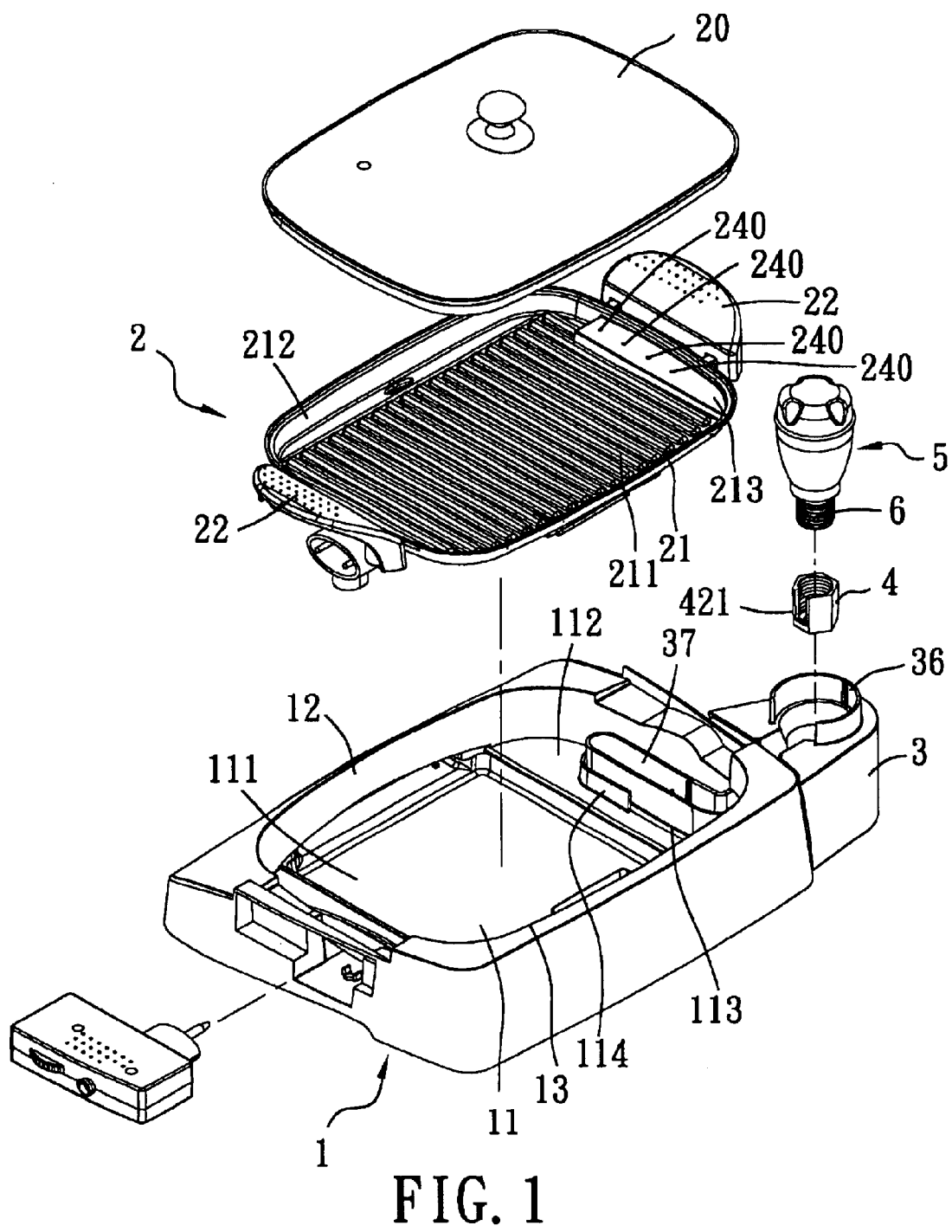
FIG. 1 is an exploded perspective view of the preferred embodiment of a grill device according to the present invention.
Figure 2:
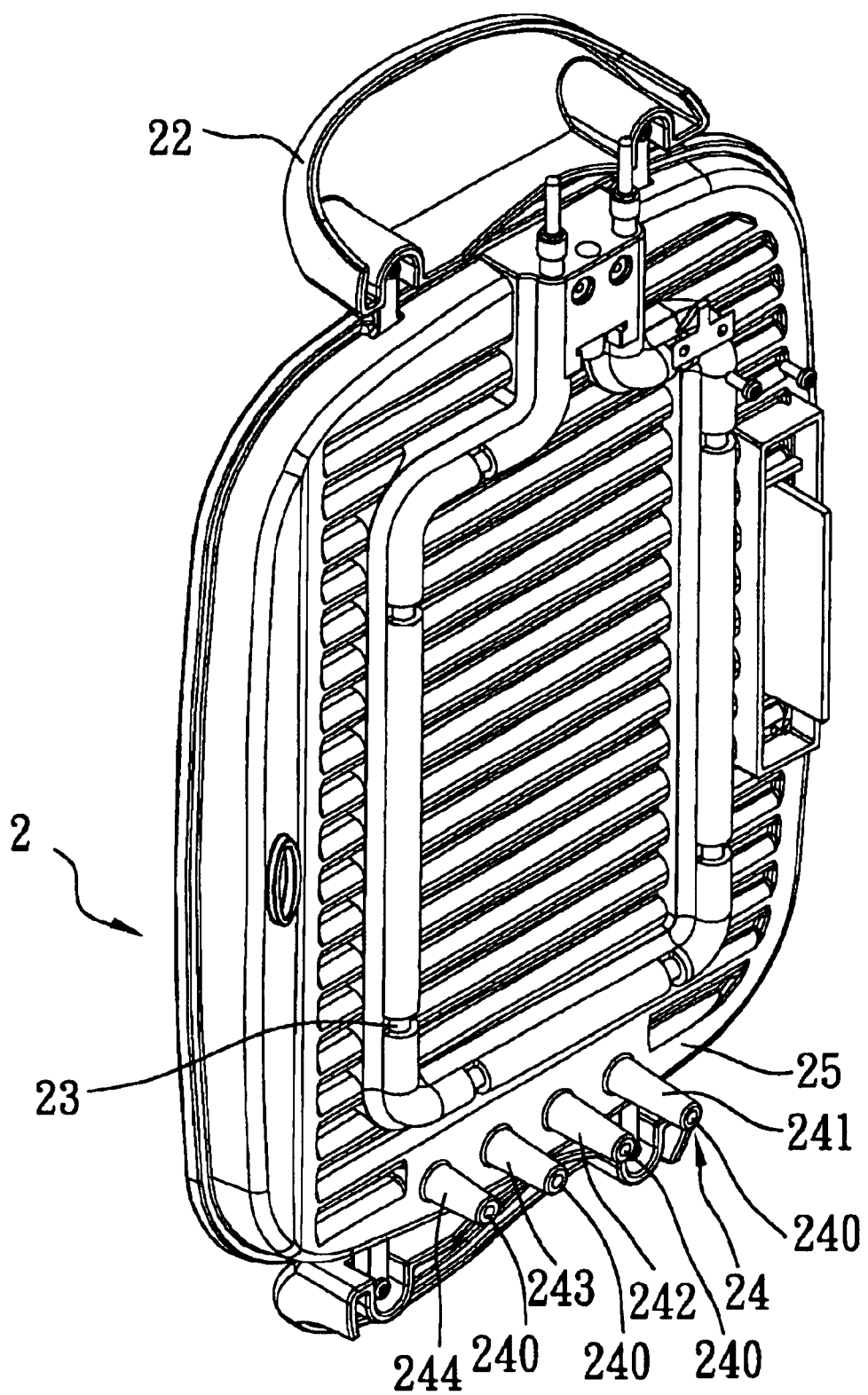
FIG. 2 is a bottom perspective view of a cooking member of a base unit of the preferred embodiment.

Referring to FIGS. 1 and 2, the preferred embodiment of a grill device according to the present invention is shown to include a base unit, a seasoning retaining vessel 3, an anchoring seat 4, and a seasoning supplying unit.

The base unit includes a housing 1, a cooking member 2, a heating element 23, and a supply tube unit 24.

The housing 1 includes a bottom portion 11 and a surrounding wall 12 that extends upwardly from a periphery of the bottom portion 11 and that supports the cooking member 2 thereon. The bottom portion 11 and the surrounding wall 12 cooperate to define a receiving space 13. The bottom portion 11 includes a base part 111 and a raised part 112 relative to the base part 111. The raised part 112 is formed with an oval opening 113 and a U-shaped barrier wall 114 that extends upwardly from a part of the periphery of the opening 113.

Figure 4:
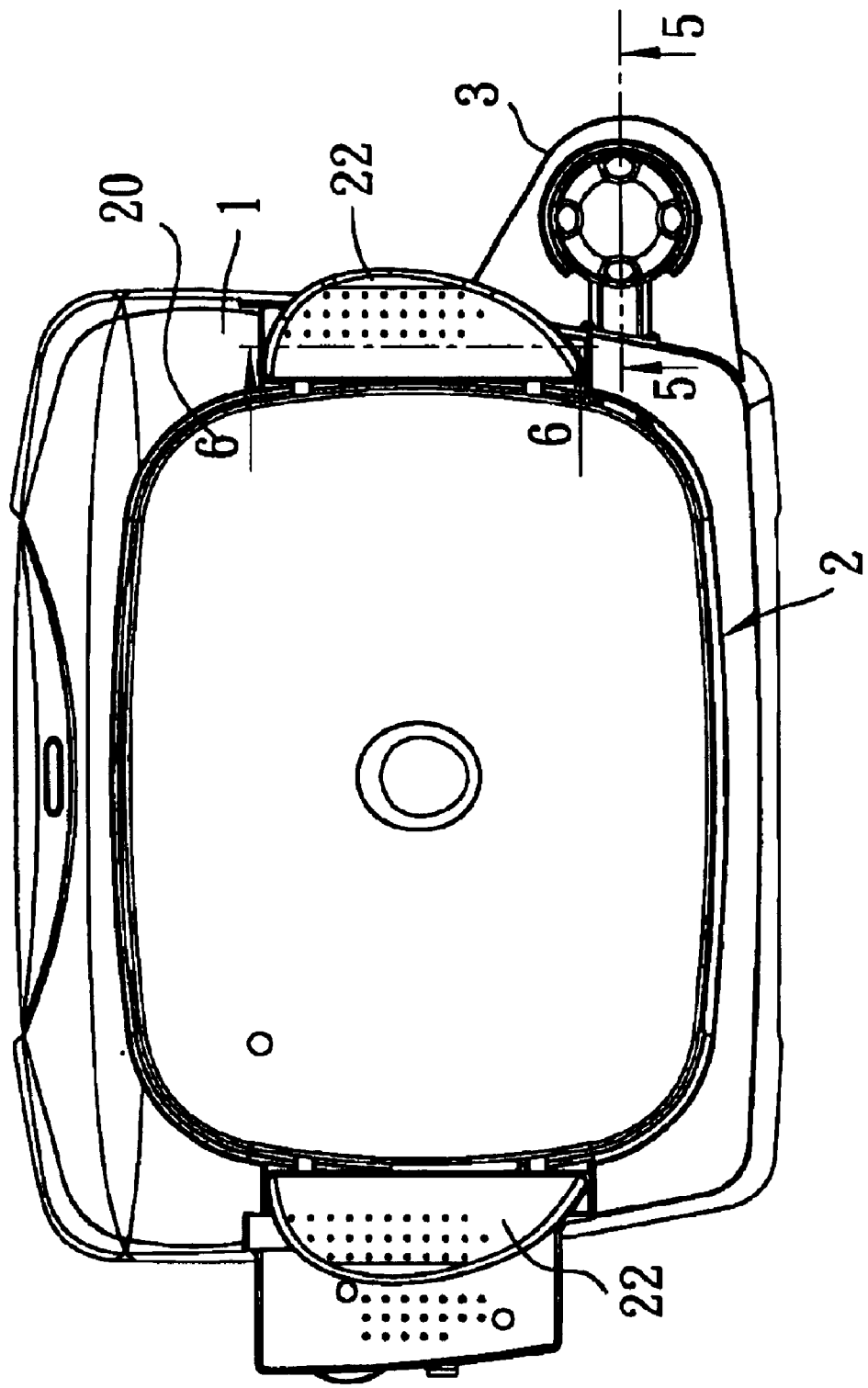
FIG. 4 is a top schematic view of the preferred embodiment.

The cooking member 2 is supported removably by a top edge of the surrounding wall 12 of the housing 1, and is made of a heat conductive material. The cooking member 2 has a top side 21 that defines a cooking space, and a bottom side 25 opposite to the top side 21. The cooking member 2 further has opposite edge portions, each of which is provided with a handle 22 thereon. A cover member 20 is disposed removably on the base unit so as to cover the cooking space, as best shown in FIG. 4. The heating element 23 is operatively coupled to the bottom side 25 of the cooking member 2 for supplying heat to the cooking member 2 in a known manner. The top side 21 of the cooking member 2 is configured with a heating portion 211 for cooking foodstuff, a surrounding portion 212 that extends upwardly from a periphery of the heating portion 211, and a seasoning dispensing portion 213 that is raised with respect to the heating portion 211. In this embodiment, the supply tube unit 24 includes four supply tubes 241, 242, 243, 244, each of which extends downwardly at different lengths relative to the cooking member 2, defines a channel 240 that extends through the seasoning dispensing portion 213 so as to communicate fluidly with the cooking space, is connected integrally to the cooking member 2, and is made of a heat conductive material. When the cooking member 2 is mounted on the housing 1, the supply tube unit 24 is disposed directly over the opening 113. In this embodiment, the heating element 23 is a known U-shaped electric heating element but should not be limited thereto.

Figure 3:
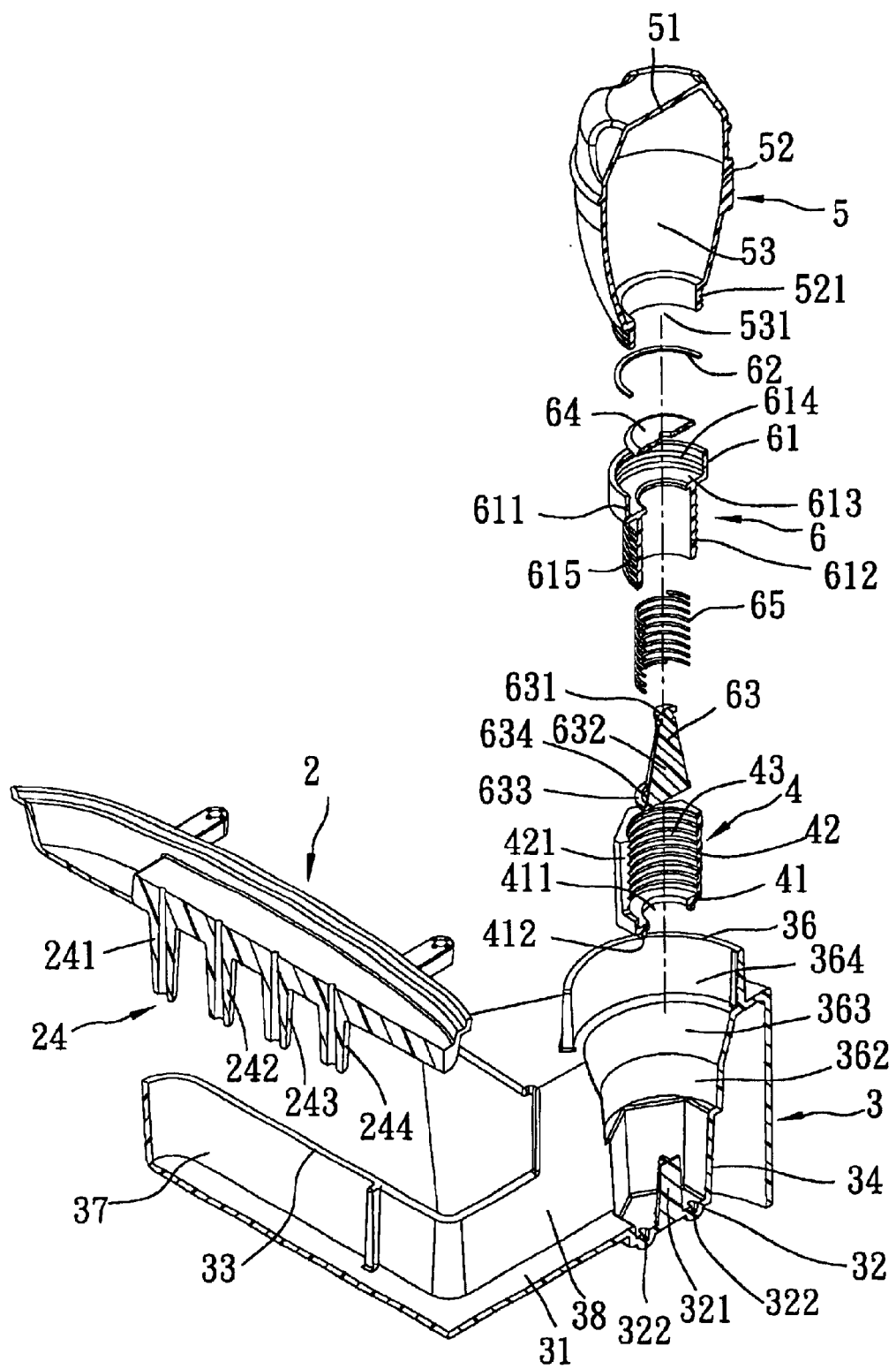
FIG. 3 is a fragmentary exploded perspective view to illustrate a seasoning supplying unit of the preferred embodiment.

Referring to FIGS. 1 and 3, the seasoning retaining vessel 3 is configured with a tube immersing portion 37 and a container mounting portion 38 in fluid communication with the tube immersing portion 37. The tube immersing portion 37 extends into the housing 1 via the opening 113 so as to be disposed under the cooking member 2 such that the supply tubes 241, 242, 243, 244 extend into the tube immersing portion 37. The seasoning retaining vessel 3 includes an L-shaped bottom wall 31 and a surrounding wall 33 that extends upwardly from a periphery of the bottom wall 31. The container mounting portion 38 includes a hexagonal bottom side 32, a hexagonal peripheral side 34, and an upper mounting side 36. The bottom side 32 is disposed at an end part of the bottom wall 31. The peripheral side 34 extends upwardly from a periphery of the bottom side 32, and cooperates with the bottom side 32 to form a space for receiving non-rotatably the anchoring seat 4 therein. The peripheral side 34 is in fluid communication with the tube immersing portion 37. The upper mounting side 36 includes a lower tubular part 362 that extends upwardly from a top edge of the peripheral side 34, an intermediate cone-shaped part 363 that extends upwardly from a top edge of the lower tubular part 362, and an upper tubular 364 that extends upwardly from a top edge of the cone-shaped part 363.

The anchoring seat 4 is mounted removably and non-rotatably in the container mounting portion 38, and is coupled threadedly to a flow control member 6 of the seasoning supplying unit. The anchoring seat 4 includes a hexagonal bottom wall 41 formed with a through hole 411, and a peripheral wall 42 that extends upwardly from a periphery of the bottom wall 41 and that is formed with an internal thread 43 and a lateral notch 421. A pin-and-hole unit is constituted by a pair of pins 412 formed on the bottom wall 41 of the anchoring seat 4 and a pair of holes 322 formed in the bottom side 32 of the container mounting portion 38, and serves to position removably the anchoring seat 4 in the container mounting portion 38. The bottom side 32 of the container mounting portion 38 is further provided with an actuator 321 that extends through the through hole 411 in the bottom wall 41 of the anchoring seat 4.

The seasoning supplying unit includes a container member 5 adapted for storing a body of seasoning in liquid form, and the flow control member 6 that is connected to the container member 5 and that is mounted adjustably on the vessel 3 in the container mounting portion 38. The flow control member 6 controls the flow of the seasoning in the container member 5 into the vessel 3 in accordance with the level of the seasoning in the vessel 3 such that the number of the supply tubes 241, 242, 243, 244 immersed in the seasoning in the tube immersing portion 37 of the vessel 3 depends on the level of the seasoning in the vessel 3 and determines a rate of vaporizing and dispensing of the seasoning to the cooking space through the supply tubes 241, 242, 243, 244.

The container member 5 includes a bottom wall 51 and a peripheral wall 52 extending from a periphery of the bottom wall 51 and cooperating with the bottom wall 51 to define a seasoning storage space 53. The container member 5 has a mouth 531 formed with an external thread 521.

Figure 5:
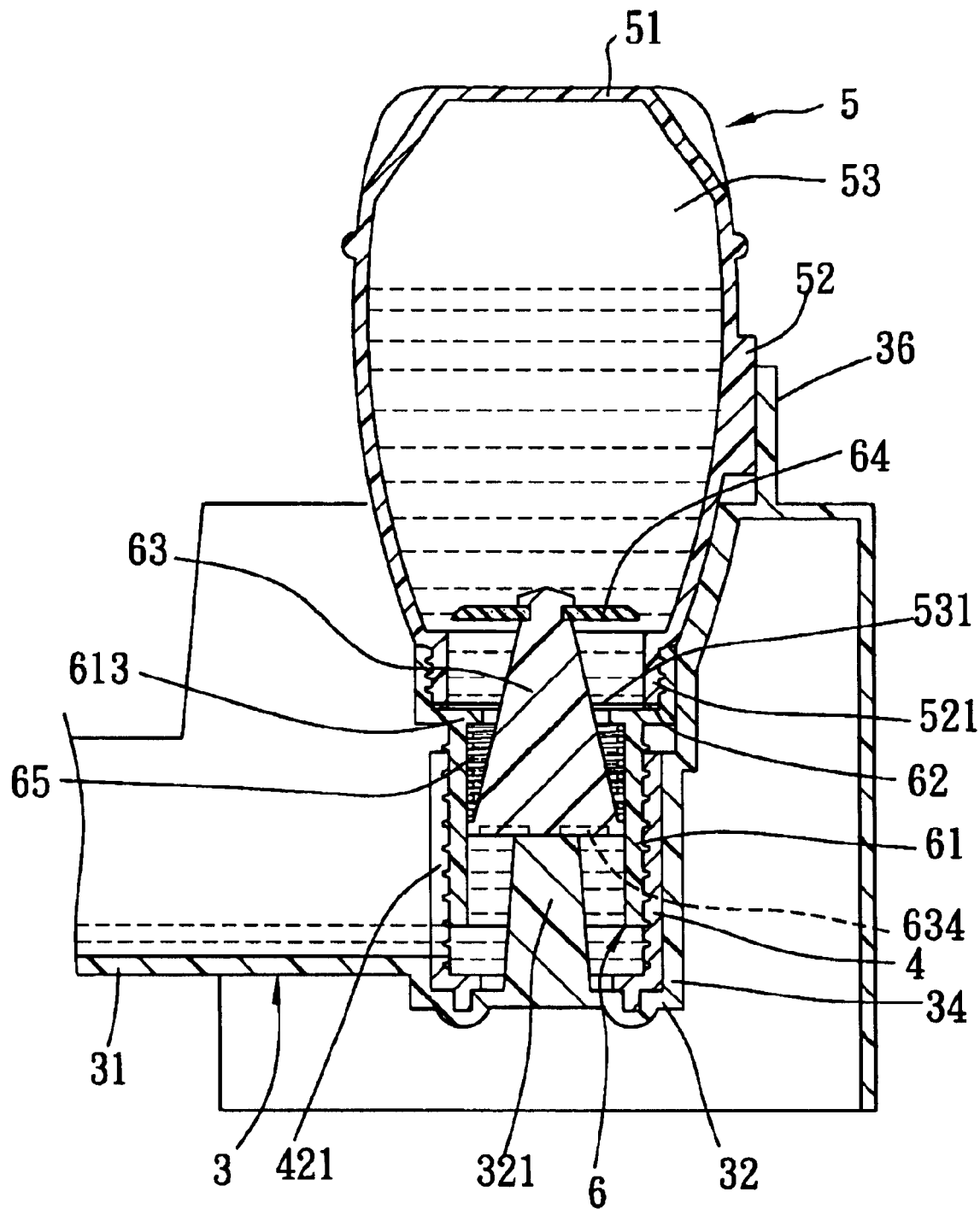
FIG. 5 is a fragmentary sectional view of the preferred embodiment, taken along lines 5—5 of FIG. 4.

Referring further to FIG. 5, the flow control member 6 includes a coupling seat 61, a seal ring 62, a valve member 63, and a biasing member 65.

The coupling seat 61 has a lower tubular portion 612 formed with an external thread 615 for engaging threadedly the anchoring seat 4, an upper tubular portion 611 formed with an internal thread 614 for connecting threadedly with the mouth 531 of the container member 5, and an annular valve seat 613 that extends radially and inwardly and that is disposed at a junction of the lower and upper tubular portions 612, 611. It should be noted there in that the lower and upper tubular portions 612, 611 are respectively threaded in opposite directions.

The washer 62 is disposed on the valve seat 613, and abuts tightly against the mouth 531 of the container member 5.

The valve member 63 is movably disposed in the coupling seat 61, and has a wider end portion 632 to be seated on the actuator 321, and an opposite narrower end portion 631 to be extended into the mouth 531 of the container member 5 and provided with a seal member 64. The wider end portion 632 is formed with an end flange 633. The end flange 633 is formed with four through holes 634.

The biasing member 65 biases the valve member 63 such that the seal member 64 blocks the valve seat 613 when the coupling seat 61 is detached from the anchoring seat 4, and is compressed when the valve member 63 is seated on the actuator 321 for moving the seal member 64 away from the valve seat 613.

In use, referring to FIGS. 1, 4, 5 and 6, after mounting the coupling seat 61 of the flow control member 6 on the mouth 531 of the container member 5, the assembly of the container member 5 and the flow control member 6 is turned upside down in preparation for mounting the coupling seat 61 on the anchoring seat 4. At this time, by virtue of the biasing member 65, the valve member 63 is biased such that the seal member 64 blocks the valve seat 613 to prevent the seasoning, such as water or red wine, in the container member 5 from flowing through the mouth 531.

Thereafter, when the coupling seat 61 is connected threadedly to the anchoring seat 4, the valve member 63 is seated on the actuator 321 such that downward movement of the container member 5 due to the threading action results in relative movement of the seal member 64 and the valve seat 613 away from each other. At this time, the seasoning in the container member 5 flows through the mouth 531, the holes 634 in the valve member 63, the notch 421 in the anchoring seat 4, and into the vessel 3. When the level of the seasoning in the vessel 3 reaches the bottom edge of the coupling seat 61, air can no longer flow into the container member 5, thereby preventing any further rise in the level of the seasoning in the vessel 3.

Figure 6:
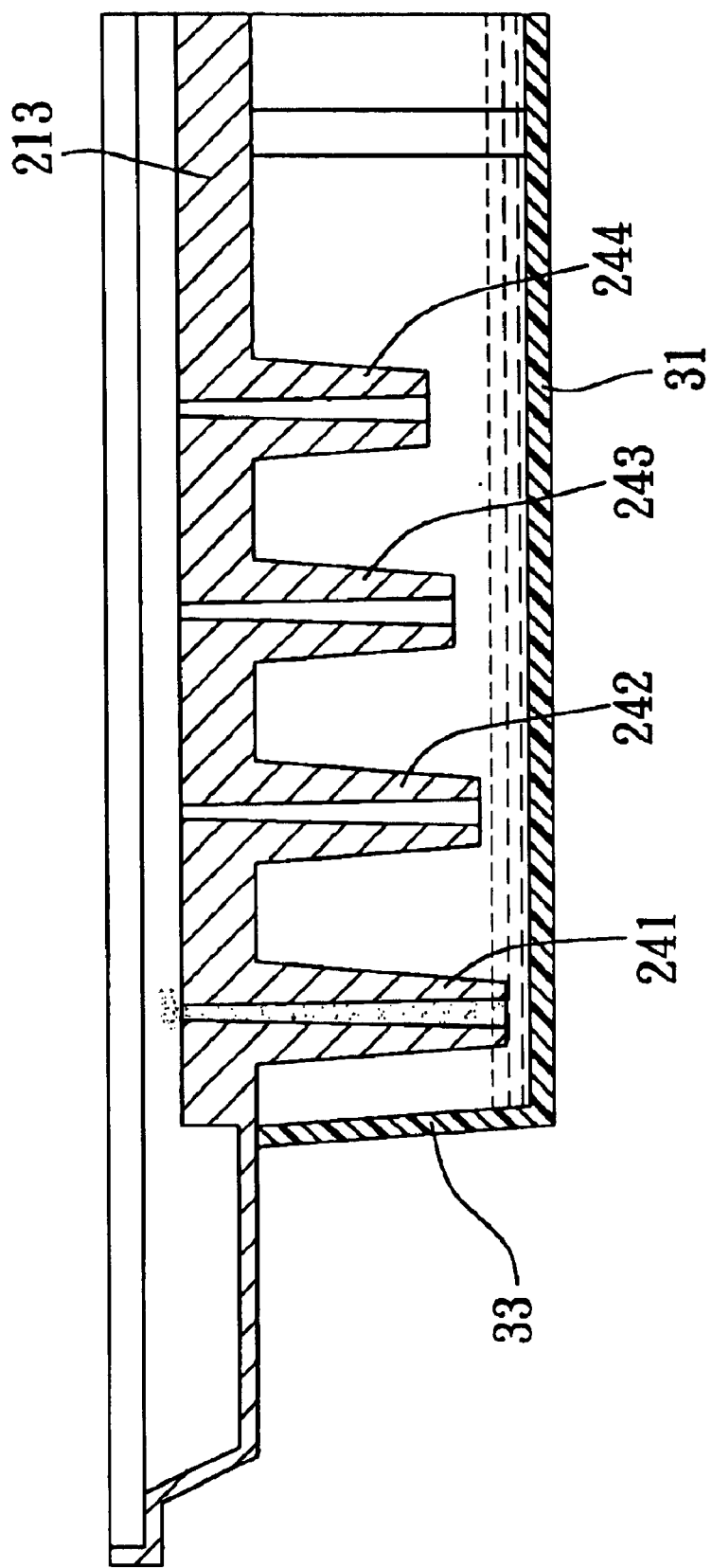
FIG. 6 is a fragmentary sectional view of the preferred embodiment, taken along lines 6—6 of FIG. 4.

FIG. 6 illustrates a state where the tip of the longest supply tube 241 is immersed in the :seasoning in the tube immersing portion 37 of the vessel 3. Accordingly, when the cooking member 2 is heated, the seasoning in the vessel 3 will be vaporized and dispensed to the cooking space through the supply tube 241.

Figure 7:
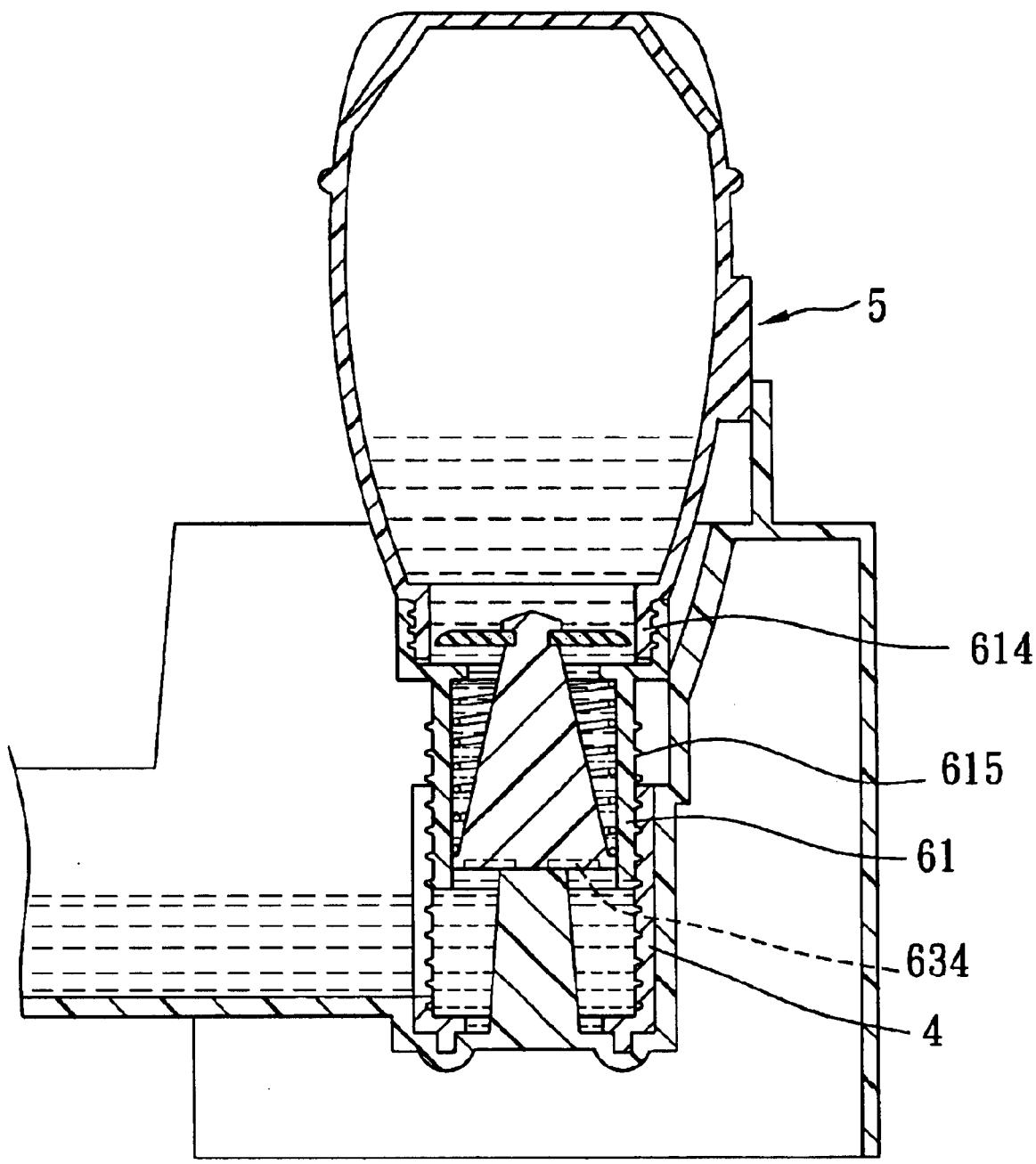
FIG. 7 is a view similar to FIG. 5, illustrating the seasoning supplying unit after adjustment to increase the rate of seasoning dispensing.
Figure 8:
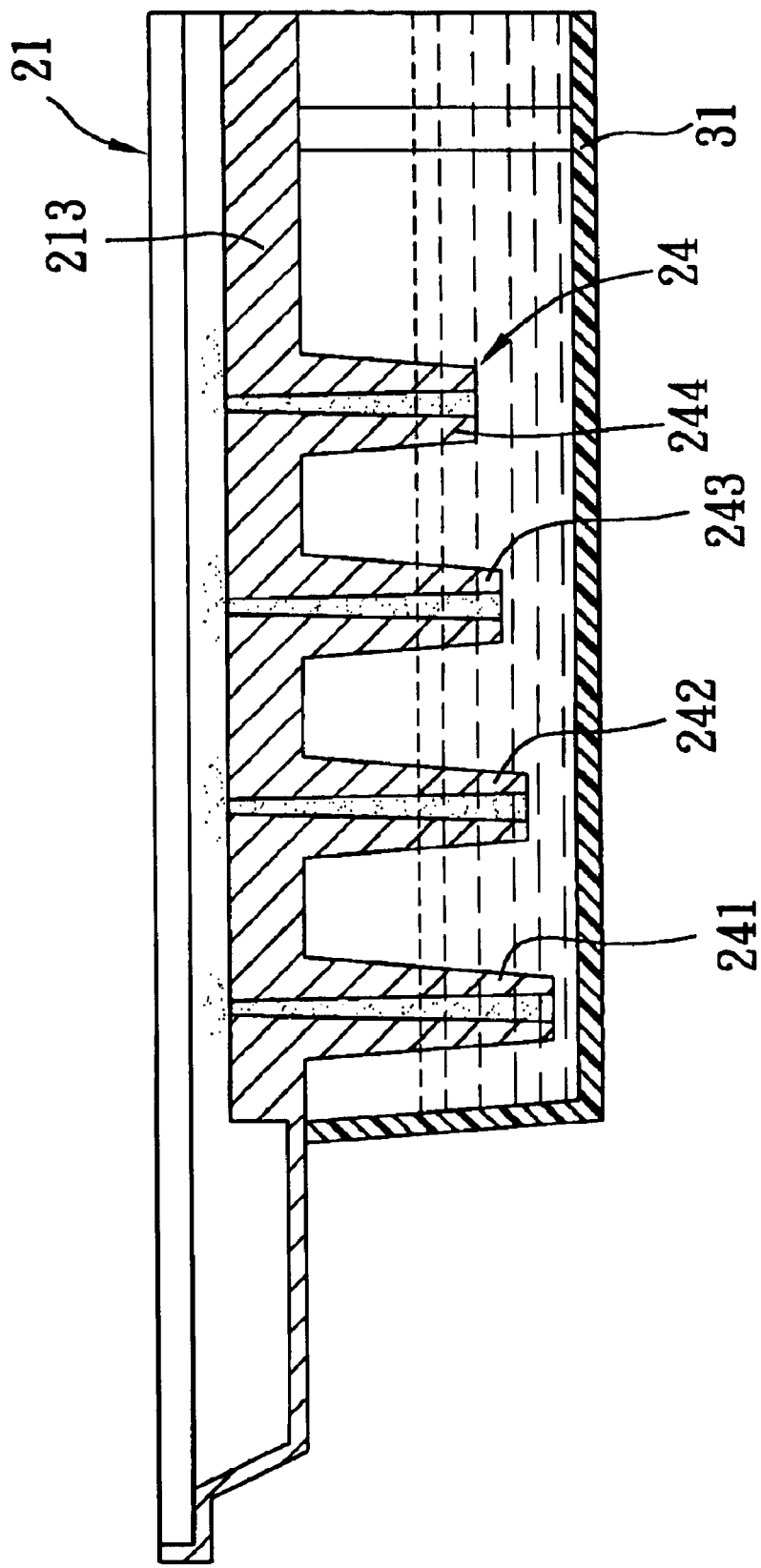
FIG. 8 is a view similar to FIG. 6, illustrating the seasoning supplying unit after adjustment to increase the rate of seasoning dispensing.

Referring to FIGS. 7 and 8, when it is desired to increase the amount of the seasoning dispensed to the cooking space, the container member 5 is operated for threading the coupling seat 61 upward relative to the anchoring seat 4. Since the lower and upper tubular portions 612, 611 of the coupling seat 61 are respectively threaded in opposite directions, tight engagement between the container member 5 and the coupling seat 61 can be ensured when the coupling seat 61 is threaded upward relative to the anchoring seat 4.

As the bottom edge of the coupling seat 61 moves upward, air is permitted to flow into the container member 5 such that the seasoning in the container member 5 is once again permitted to flow into the vessel 3 until the level of the seasoning in the vessel 3 reaches the bottom edge of the coupling seat 61.

FIG. 8 illustrates a state where the tips of the four supply tubes 241, 242, 243, 244 are immersed in the seasoning in the tube immersing portion 37 of the vessel 3. Accordingly, when the cooking member 2 is heated, the seasoning in the vessel 3 will be vaporized and dispensed to the cooking space through the supply tubes 241, 242, 243, 244. The seasoning dispensing rate is at a maximum at this time.

In practice, a variable seasoning dispensing rate is still possible even when the supply tube unit 24 includes only one supply tube. As long as the level of the seasoning in the vessel 3 is variable, the contact area of the sole supply tube with the seasoning in the vessel 3 can be varied to vary in turn the rate of vaporization of the seasoning in the vessel 3 when the cooking member 2 is heated.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A grill device comprising:
    a base unit including
        a housing,
        a cooking member mounted in said housing, made of a heat conductive material, and having a top side that defines a cooking space, and a bottom side opposite to said top side,
        a heating element operatively coupled to said cooking member for supplying heat to said cooking member, and
        at least one supply tube connected to said cooking member, extending downwardly relative to said cooking member, and defining a channel that is in fluid communication with said cooking space;
    a seasoning retaining vessel having a tube immersing portion and a container mounting portion in fluid communication with said tube immersing portion, said tube immersing portion being disposed under said cooking member such that said at least one supply tube extends into said tube immersing portion; and
    a seasoning supplying unit including
        a container member adapted for storing a body of seasoning in liquid form, and
        a flow control member connected to said container member and mounted adjustably on said vessel in said container mounting portion, said flow control member controlling flow of the seasoning in said container member into said vessel in accordance with level of the seasoning in said vessel.

2. The grill device as claimed in claim 1, wherein said base unit includes at least two of said supply tubes that extend downwardly at different lengths into said tube immersing portion of said vessel, said flow control member controlling flow of the seasoning in said container member into said vessel such that the number of said supply tubes immersed in the seasoning in said tube immersing portion of said vessel depends on the level of the seasoning in said vessel and determines a rate of vaporizing and dispensing of the seasoning to said cooking space through said supply tubes.

3. The grill device as claimed in claim 2, wherein said supply tubes are connected integrally to said cooking member and are made of a heat conductive material.

4. The grill device as claimed in claim 1, wherein said housing includes a bottom portion, and a surrounding wall that extends upwardly from a periphery of said bottom portion and that supports said cooking member thereon, said housing being formed with an opening that permits extension of said tube immersing portion of said vessel into said housing.

5. The grill device as claimed in claim 4, wherein said housing is further formed with a barrier wall at a periphery of said opening.

6. The grill device as claimed in claim 1, wherein said cooking member has opposite edge portions, each of which is provided with a handle thereon.

7. The grill device as claimed in claim 1, further comprising an anchoring seat mounted non-rotatably in said container mounting portion and coupled threadedly to said flow control member.

8. The grill device as claimed in claim 7, wherein said anchoring seat includes a non-circular bottom wall formed with a through hole, and a peripheral wall that extends upwardly from a periphery of said bottom wall and that is formed with an internal thread and a lateral notch.

9. The grill device as claimed in claim 8, wherein said container mounting portion includes a non-circular bottom side, and a peripheral side that extends upwardly from a periphery of said bottom side, said peripheral side being in fluid communication with said tube immersing portion of said vessel, and cooperating with said bottom side to form a space for receiving non-rotatably said anchoring seat therein.

10. The grill device as claimed in claim 9, further comprising a pin-and-hole unit provided on said bottom wall of said anchoring seat and said bottom side of said container mounting portion for positioning removably said anchoring seat in said container mounting portion.

11. The grill device as claimed in claim 9, wherein said bottom side of said container mounting portion is provided with an actuator that extends through said through hole in said bottom wall of said anchoring seat.

12. The grill device as claimed in claim 11, wherein said flow control member includes:
    a coupling seat having a lower tubular portion that engages threadedly said anchoring seat, an upper tubular portion that is connected threadedly to said container member, and an annular valve seat that extends radially and inwardly and that is disposed at a junction of said lower and upper tubular portions;
    a valve member movably disposed in said coupling seat, and having one end to be seated on said actuator, and an opposite end to be extended into said container member and provided with a seal member; and
    a biasing member for biasing said valve member such that said seal member blocks said valve seat when said coupling seat is detached from said anchoring seat, said biasing member being compressed when said valve member is seated on said actuator for moving said seal member away from said valve seat.

13. The grill device as claimed in claim 12, wherein said lower and upper tubular portions are respectively threaded in opposite directions.

14. The grill device as claimed in claim 12, wherein said container member has a mouth formed with an external thread for engaging said coupling seat.

15. The grill device as claimed in claim 1, further comprising a cover member disposed removably on said base unit so as to cover said cooking space.

* * * * *